United States Patent [19]
Golden, Jr.

[11] 4,366,016
[45] Dec. 28, 1982

[54] METHOD AND APPARATUS FOR PRODUCING A PLASTIC SLEEVE

[75] Inventor: Leonard W. Golden, Jr., Portage, Ohio

[73] Assignee: Owens-Illinois, Inc., Toledo, Ohio

[21] Appl. No.: 277,311

[22] Filed: Jun. 25, 1981

[51] Int. Cl.³ .............................................. B29D 23/10
[52] U.S. Cl. ..................................... 156/218; 156/456; 156/457; 156/582; 156/583.1; 493/306
[58] Field of Search ................. 156/582, 583.1, 583.5, 156/446–450, 456–458, 184, 218; 493/305, 306, 105–108; 53/234, 575

[56] References Cited
U.S. PATENT DOCUMENTS

| | | | |
|---|---|---|---|
| 2,234,175 | 3/1941 | Jackson et al. | 53/575 X |
| 3,058,514 | 10/1962 | Flood | 156/458 X |
| 3,851,443 | 12/1974 | Fine | 156/583.1 X |
| 4,080,879 | 3/1978 | Hoden | 493/306 X |
| 4,162,600 | 7/1979 | Westall et al. | 53/575 X |
| 4,175,993 | 11/1979 | Robertson | 156/582 X |
| 4,285,750 | 8/1981 | DeMartino | 156/456 X |
| 4,310,369 | 1/1982 | Miller | 156/458 X |

Primary Examiner—David A. Simmons
Attorney, Agent, or Firm—D. R. Birchall; Myron E. Click; David H. Wilson

[57] ABSTRACT

The making of a tubular sleeve of thermoplastic material wherein a strip of sheet stock is fed to a rotatable turret having a plurality of rotatable mandrels thereon, the strip is severed into individual rectangular blanks, each having a leading edge and a trailing edge, each blank is formed into a cylindrical shaped sleeve wrapped around a mandrel with the trailing edge overlapping the exterior of the leading edge of the blank, the mandrels are moved past a sealing station and a plurality of bars are rotated so they move successively in an arcuate path generally tangentially to the path of the blank to bring the sealing surface of each bar into engagement with the overlapped edges and apply radial pressure thereto to fuse the edges together and form a seam.

9 Claims, 6 Drawing Figures

METHOD AND APPARATUS FOR PRODUCING A PLASTIC SLEEVE

BACKGROUND OF THE INVENTION

For some time it has been common to manufacture drinking cups, other containers and plastic sleeves for bottles from expanded thermoplastic materials. A popular material currently in use for containers, etc. is expanded oriented polystyrene. A very popular container of this type is a cup that is molded directly from expandable polystyrene beads in a steam chest. However, cups formed in this manner must have a sidewall that is quite thick in comparison to, for example, paper. The added thickness of a cup formed by the molded steam chest method does not lend itself to a small stacking height, thus more space is required for a stack of a given number of cups. Then too, the inherent mode of manufacture of the steam chested cup prevents it being decorated to any degree until it is completely formed. The decoration of completed cups requires printing techniques that are slower and more expensive then flexographic and other sheet printing techniques employed on sheet stock which is preprinted prior to incorporation into containers or for sleeves used as protective overwrap on glass containers such as bottles.

This invention is intended for use on plastic sleeve forming machines of the type disclosed in U.S. Pat. No. 3,970,492 issued to S. W. Amberg, et al on July 20, 1976, and U.S. Pat. No. 3,802,942 issued to S. W. Amberg, et al on Apr. 9, 1974. These machines are used to form sleeves from thermoplastic material by forming a rectangular sheet of material into a tubular shape having overlapping end portions and sealing the end portions together. The completed sleeves are then used to form either a thermoplastic cup or a shrink wrap covering for a glass container. In both of the above mentioned U.S. patents the seam is formed by heating the overlapping end portions of a formed tubular shape to soften their facing surfaces and pressing the end portions together to form a seam. The pressing is done by means of a bar and results in a slight indentation in the area where the bar contacts the plastic material. The pressing action causes some distortion in the cellular structure of the thermoplastic material, with a resultant deterioration of insulative properties in the seam area. In U.S. Pat. No. 4,013,496 issued to S. W. Amberg on Mar. 22, 1977, the seam is formed by means of a spring loaded roller which presses against the overlapping edges of the tubular sleeve. Since the roller which forms the seam is spring loaded and the seam is formed basically by a pressing action, the thickness of the seam may be different from that of the remainder of the formed sleeve.

In copending application Ser. No. 059,726, filed July 23, 1979 and having a common assignee with this application, there is disclosed and claimed a method and apparatus for forming a seam on a cylindrical sleeve of thermoplastic material which has both a uniform thickness when compared to the remainder of the sleeve and whose insulative properties also conform substantially to those of the remainder of the sleeve. This is accomplished by means of a curvelinear sealing plate section positioned at a fixed location along a peripheral path of a series of vertically disposed rotating sleeve forming mandrels mounted on a rotating turret. The overlapping seam edges are heated to fusing temperature and sealed together when the mandrel passes the sealing plate. The curved sealing plate meters a uniform thickness of the material through its arcuate path and a constant ironing or wiping pressure is applied at the seam area, the ironing process results in a uniform bonding of the two surfaces which form the seam. The length of the sealing plate can be such that the mandrel will complete several rotations as it passes by the plate, thus causing the seam ironing process to be repeated several times.

Such a method and apparatus sometimes results in scuffing and poor side seals.

Among the objectives of the present invention are to provide a method and apparatus for producing a sleeve that will eliminate any tendency toward scuffing or movement of the shell on the mandrel, provide a uniform and good seal; and will compress the upper portion of the seam to give a more uniform rim.

In accordance with the invention, the method and apparatus comprises moving the mandrels with the exteriorly positioned blanks past a sealing station where a plurality of bars are rotated so they move successively in an arcuate path generally tangentially to the path of the blank to bring the sealing surface of each bar into engagement with the overlapped edges and apply radial pressure thereto to fuse the edges together and form a seam.

DESCRIPTION

Figure 1:
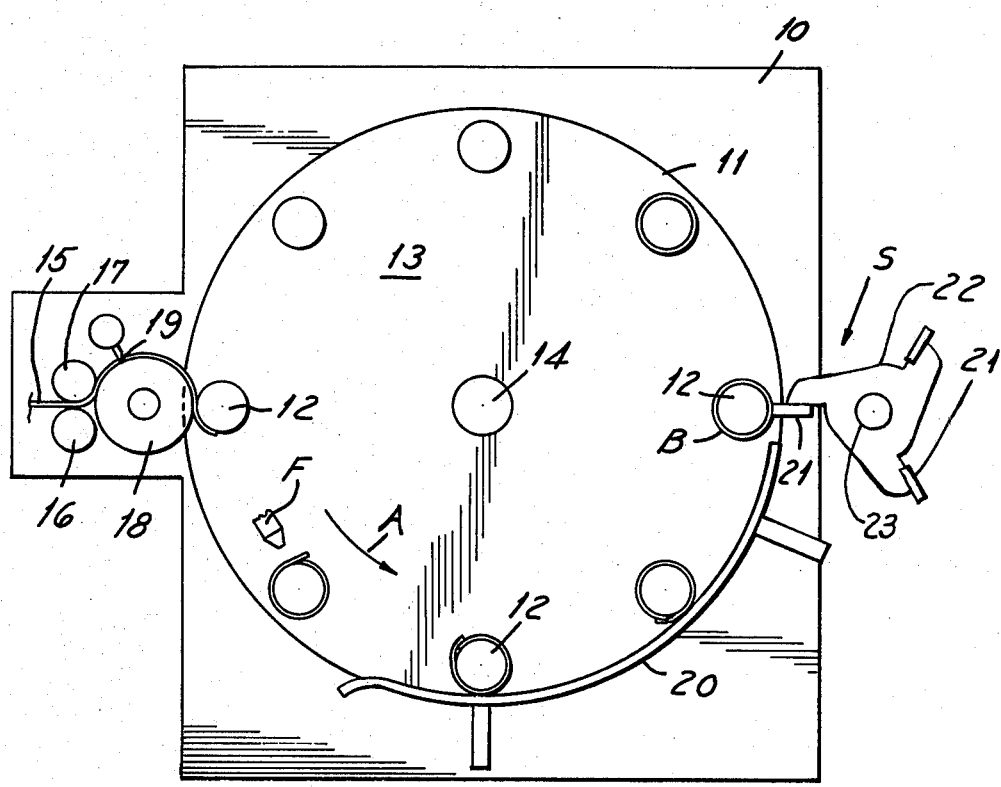
FIG. 1 is a diagram of an apparatus embodying the invention.

FIG. 1 is a simplified diagram of the apparatus embodying the invention. The base 10 provides structure for a mandrel support turret 11 which carries an array of sleeve winding mandrels 12. A feed drum 18 delivers a measured length of plastic sheet material to each one of the sleeve winding mandrels 12.

More particularly, the base 10 provides the necessary structure for the mandrel support turret 11 so that it may rotate about a central pivot 14. The mandrel support turret 11 is positioned so that its deck 13 is generally horizontal and the turret is capable of rotation in either direction. For purposes of this invention, the rotation of the mandrel support turret 11 is in the direction of arrow A. Also, power to the turret 11 and other moving parts of the apparatus has not been shown since it is well within the skill of the ordinary person to visualize how each part could be powered.

Referring once again to FIG. 1, a web of plastic strip stock 15 is drawn through a pair of opposed feed rollers 16 and 17. The strip stock 15 is then directed around the exterior of the feed drum 18. The strip stock 15 is stabilized and held against the surface of feed drum 18 by means of a vacuum applied through a plurality of vacuum ports which are aligned over the surface of feed drum 18.

As the strip stock moves around feed drum 18, a rotary knife 19 cuts the strip stock 15 into individual rectangular lengths, hereinafter referred to as blanks B.

The severed blank B is held against the surface of feed drum 18 by vacuum supplied through ports until the leading edge of blank B is in close tangential proximity with a sleeve winding mandrel 12. At this instant, the vacuum beneath the leading edge is reversed to a positive pressure, thus releasing the leading edge so that it may be picked up by the vacuum ports located over the surface of the sleeve winding mandrel 12.

As the sleeve winding mandrel 12 rotates about its own axis by a drive means not shown, the blank B is completely transferred from the feed drum 18 to the sleeve winding mandrel 12. After the transfer of the blank B has been completed, the trailing edge overlaps the leading edge of blank B as shown in the drawings.

A plurality of sleeve winding mandrels 12 is circumferentially located on the top deck of mandrel support turret 12. Each winding mandrel 12 receives a blank B as the winding mandrel passes the feed drum 18.

As previously stated, the trailing edge overlaps the leading edge of blank B. Heat is applied to both the inside and outside surfaces of the trailing edge by a blower F which is positioned adjacent sleeve winding mandrel 12. Each one of the mandrels 12 has its own blower. A hot gaseous medium such as air is directed toward the trailing edge which protrudes somewhat because it is not being held by the vacuum of mandrel 12. The hot gaseous medium exiting from blower heats not only the exterior surface of trailing edge, but also the interior surface as well. In order to assist the hot gaseous medium exiting from blower, it is also possible to introduce a solvent spray either through the blower or by a separate spray system nearby to aid in conditioning the interior surface of the trailing edge of blank B so that it will adhere to the exterior of the surface of leading edge.

The above described construction is shown in the aforementioned patents, which may be referred to for details of construction which are incorporated herein by reference.

As shown in FIG. 1, after a blank has been wrapped around each mandrel 12 in succession with the edges overlapped, the turret 11 carries each mandrel 12 in an arcuate path. As the mandrels move in the arcuate path, a plurality of vertically spaced blank guide fins 20 mounted adjacent the path engage the periphery of the blanks to hold the overlapped edges in position until the mandrels 12 with the blanks B thereon move to a sealing station S. At the sealing station S, one of a plurality of circumferentially spaced seal bars 21 moves in an arcuate path generally tangential to the periphery of the mandrel 12 to apply a radial pressure to the overlapped seams and thereby fuse the seams to complete the tubular part or sleeve.

Figure 2:
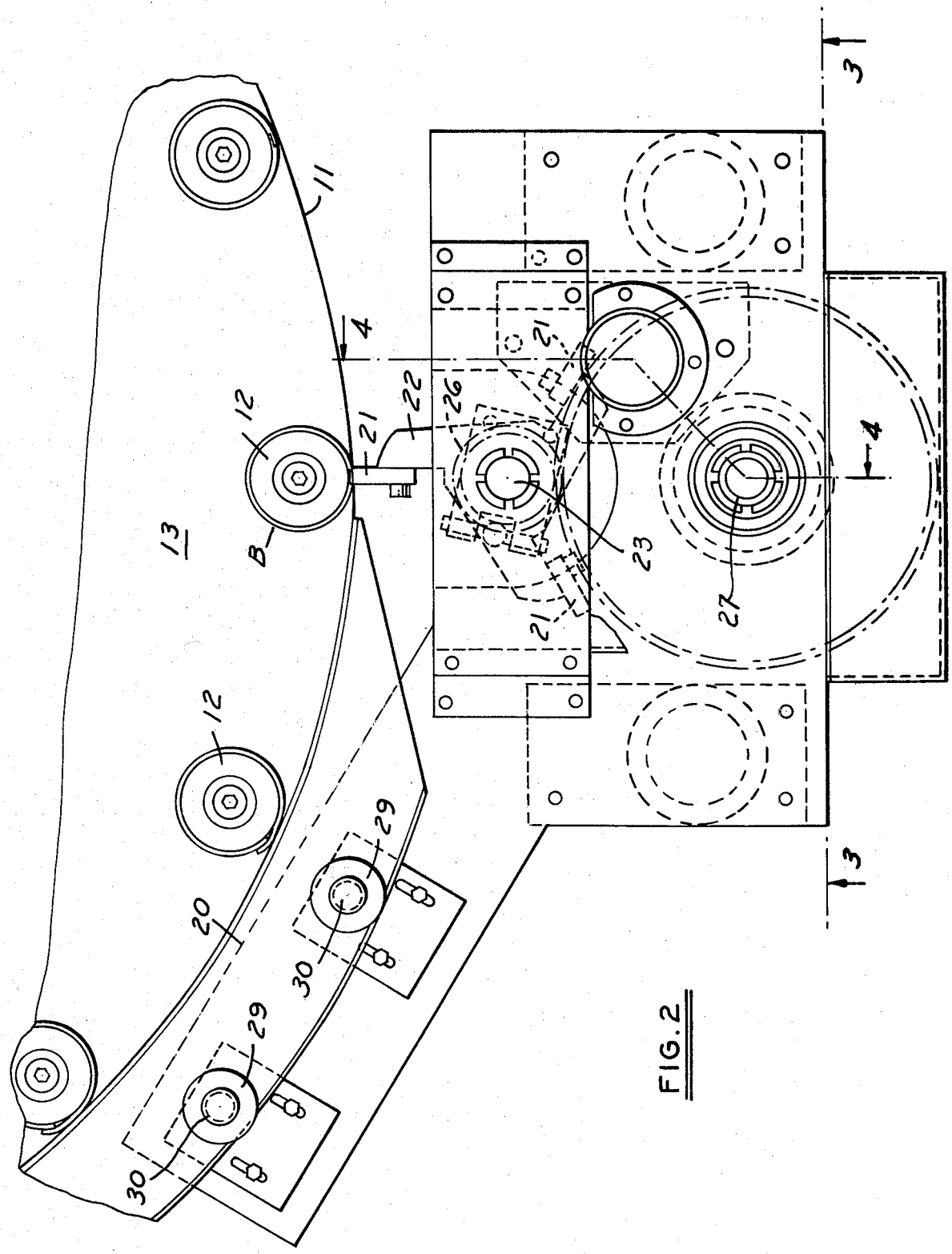
FIG. 2 is a fragmentary plan view of an apparatus embodying the invention.
Figure 3:
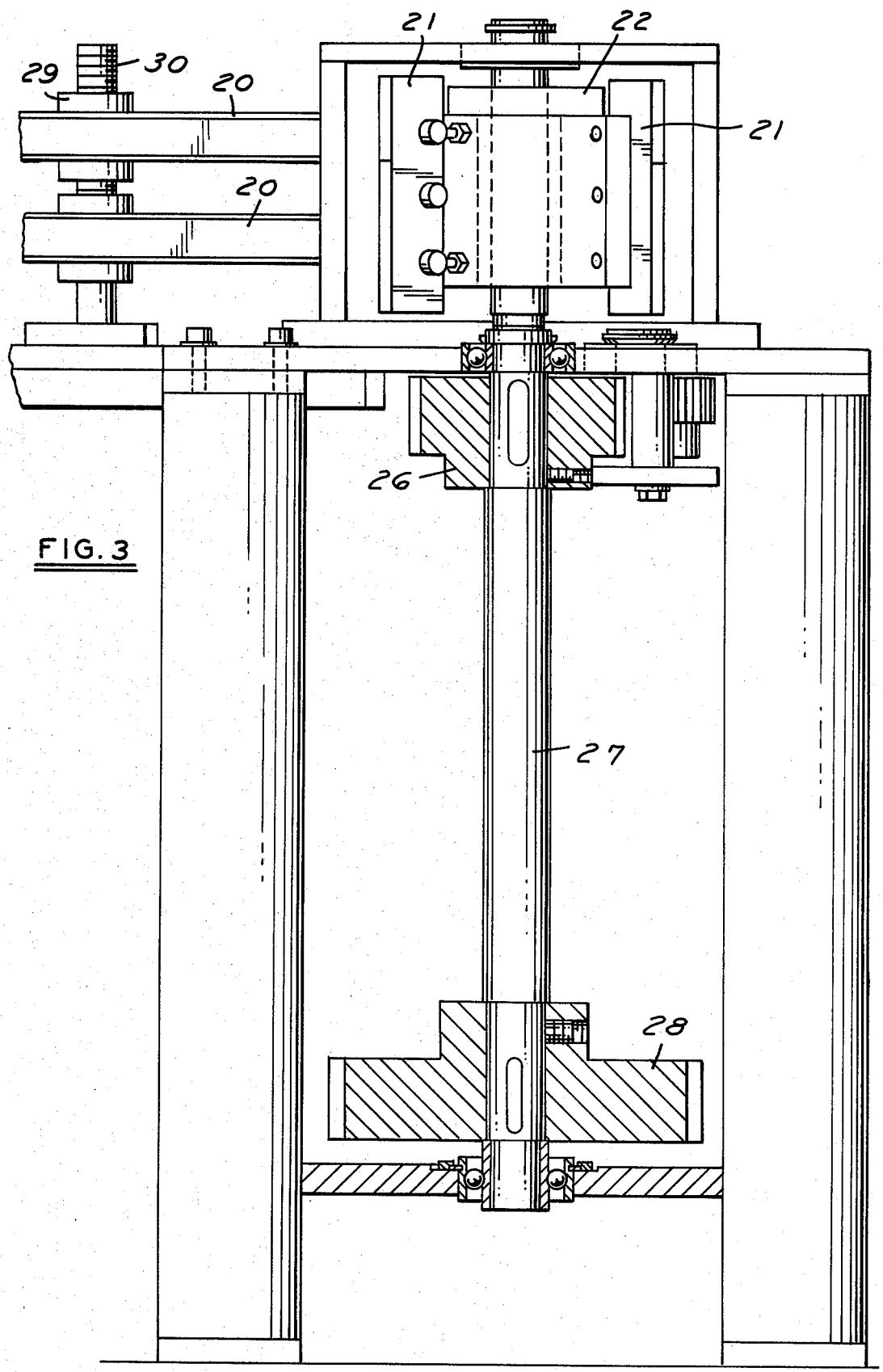
FIG. 3 is a fragmentary sectional view on an enlarged scale taken along the line 3—3 in FIG. 2.
Figure 4:
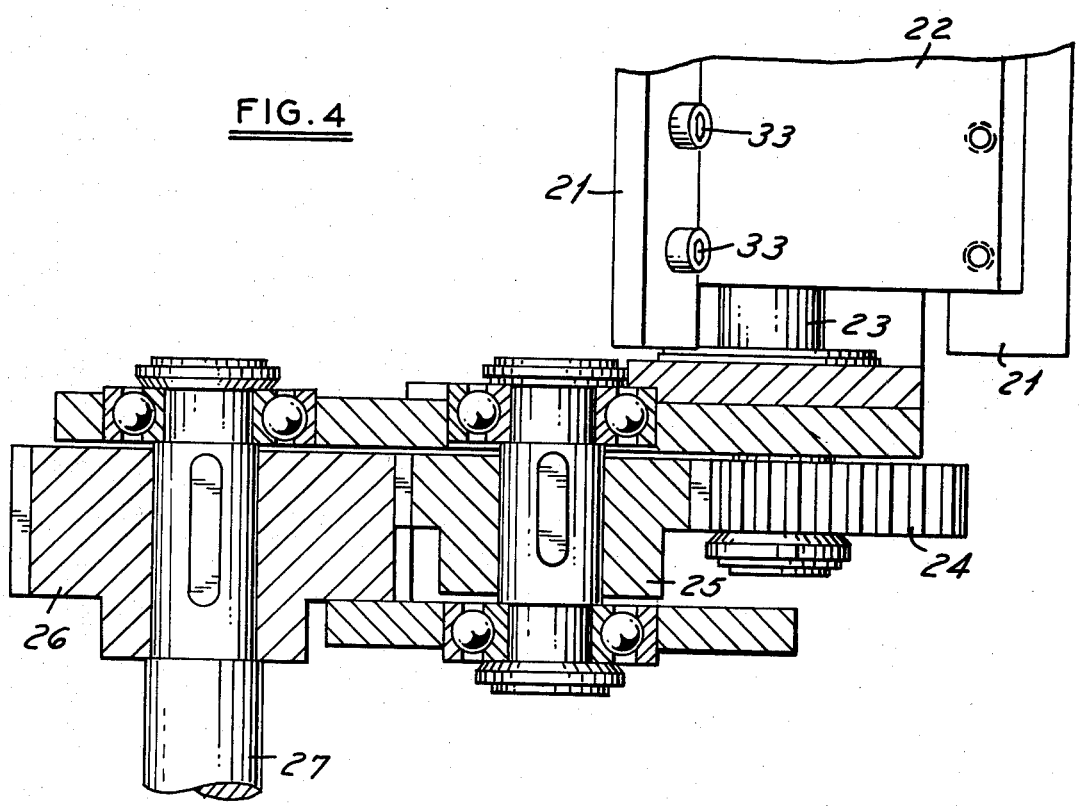
FIG. 4 is a fragmentary sectional view on an enlarged scale taken along the line 4—4 in FIG. 2.
Figure 5:
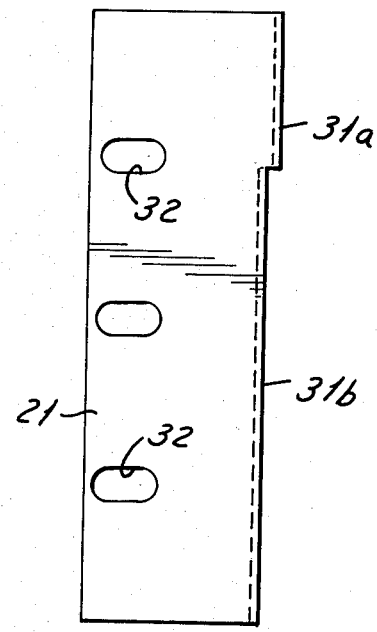
FIG. 5 is an elevational view of a sealing bar utilized in the apparatus.
Figure 6:
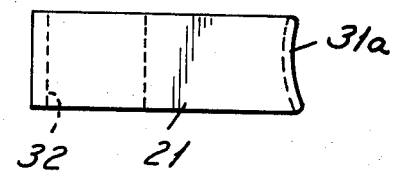
FIG. 6 is a plan view of the sealing bar.

As shown in FIGS. 2-4, each of the seal bars 21 is mounted on a head 22 which is fixed on a rotating shaft 23. The shaft 23 is rotated through a gear 24 on shaft 23, meshing with an intermediate gear 25 which, in turn, meshed with a gear 26 on a drive shaft 27. Drive shaft 27 has a gear 28 at its lower end that meshes with the drive of the turret so that the sealing bars 21 are rotated in timed relationship to the movement of the turret 11.

As shown in FIG. 3, the guide 20 fins are supported on brackets 29 which, in turn, are adjustably mounted on vertical shafts 30 on the frame.

Each of the seal bars 21 is preferably formed with an arcuate concave contacting surface corresponding to the radius of the periphery of the blank and preferably includes a first upper portion 31a extending radially toward the blank a greater distance than a second lower portion 31b. The stepped construction of the sealing blade 21 is preferred in order to apply an extra pressure to the upper part of the cylindrical blank which may subsequently be formed into a lip of a drinking cup or the like.

In order to adjust the position of each seal bar 21 accurately, it is provided with elongated slots 32 through which bolts 33 extend for fastening the bar to arms extending radially outwardly from the head.

I claim:

1. In an apparatus for forming a plastic sleeve wherein a strip of sheet stock is fed to a winding apparatus including a rotatable turret having a plurality of rotatable sleeve forming mandrels positioned circumferentially thereof and wherein individual blanks are severed from the strip and formed about each mandrel by wrapping it around the mandrel and overlapping the trailing edge of each blank so that it is exterior of the leading edge of each blank, the improvement comprising a rotating side seam mechanism positioned adjacent the turret and the path of the mandrels, a seal bar mounted on said mechanism and having a sealing surface adapted to engage the overlapping ends of the blank to form a fused seam having a thickness corresponding generally to the thickness of the strip of sheet stock, said contacting surface including a first portion extending radially outwardly greater than a second portion such that a greater pressure is applied to one part of the seam than the other.

2. In an apparatus for forming a plastic sleeve wherein a strip of sheet stock is fed to a winding apparatus including a rotatable turret having a plurality of rotatable sleeve forming mandrels positioned circumferentially thereof and wherein individual blanks are severed from the strip and formed about each mandrel by wrapping it around the mandrel and overlapping the trailing edge of each blank so that it is exterior of the leading edge of each blank, the improvement comprising a rotating side seam mechanism positioned adjacent the turret and the path of the mandrels, a seal bar mounted on said mechanism for movement in a circular path tangential to the path of the mandrels and having a sealing surface adapted to engage the overlapping ends of the blank on a mandrel as it moves in an arcuate path past the side seam mechanism to form a fused seam having a thickness corresponding generally to the thickness of the strip of sheet stock.

3. The apparatus set forth in claim 2 wherein said seal bar has an arcuate contacting surface.

4. The apparatus set forth in claim 2 or 3 wherein said contacting surface includes a first portion extending radially outwardly greater than a second portion such that a greater pressure is applied to one part of the seam than the other.

5. The apparatus set forth in claim 2 wherein said seal bar is continuously moving during the application of the pressure to the seam.

6. The apparatus set forth in claim 2 including additional seal bars circumferentially spaced with respect to the first-mentioned seal bar such that the seal bars successively move in a circular path into engagement with successive blanks on successive mandrels.

7. The apparatus set forth in claim 6 including means for adjusting the position of each said seal bar radially relative to said sealing mechanism.

8. In the method for making a tubular sleeve of thermoplastic sheet material wherein a strip of sheet stock is fed to a rotatable turret having a plurality of rotatable mandrels thereon, the strip is severed into individual rectangular blanks, each having a leading edge and a trailing edge, and each blank is formed into a cylindrical shaped sleeve wrapped around a mandrel with the trailing edge overlapping the exterior of the leading edge of the blank, the improvement comprising moving the mandrel and its exteriorly positioned blank past a sealing station, and moving in a circular path past said sealing station such that the sealing surface of each sealing bar moves generally tangential to the curvature of the blank to bring the sealing surface of the bar into engagement with the overlapped edges and apply radial pressure thereto to fuse the edges together and form a seal.

9. In an apparatus for forming a plastic sleeve wherein a strip of sheet stock is fed to a winding apparatus including a rotatable turret having a plurality of rotatable sleeve forming mandrels positioned circumferentially thereof and wherein individual blanks are severed from the strip and formed about each mandrel by wrapping it around the mandrel and overlapping the trailing edge of each blank so that it is exterior of the leading edge of each blank, the improvement comprising a rotating side seam mechanism positioned adjacent the turret and the path of the mandrels, a plurality of bars mounted on said mechanism, each bar having a sealing surface adapted to engage the overlapping ends of the blank to form a fused seam having a thickness corresponding generally to the thickness of the strip of sheet stock, and seal bars engaging successive blanks on successive mandrels, each said sealing bar having an arcuate contacting surface, said contacting surface including a first portion extending radially outwardly greater than a second portion such that greater a pressure is applied to one part of the seam than the other.

* * * * *

UNITED STATES PATENT OFFICE
CERTIFICATE OF CORRECTION

PATENT NO. : 4,366,016
DATED : December 28, 1982
INVENTOR(S) : L. W. Golden, Jr.

It is certified that error appears in the above-identified patent and that said Letters Patent are hereby corrected as shown below:

Col. 6, line 14 (Claim 9) "and" should be --said--.

Signed and Sealed this

Thirty-first Day of May 1983

[SEAL]

Attest:

DONALD J. QUIGG

Attesting Officer

Acting Commissioner of Patents and Trademarks